Nov. 27, 1923.
W. CALAGAINS
AIRPLANE
Filed Aug. 22, 1923
1,475,790
2 Sheets-Sheet 1
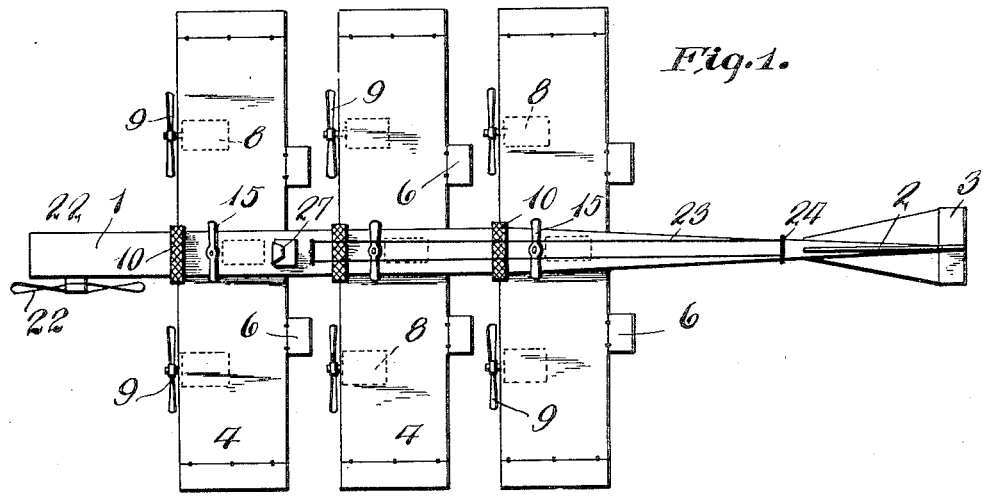
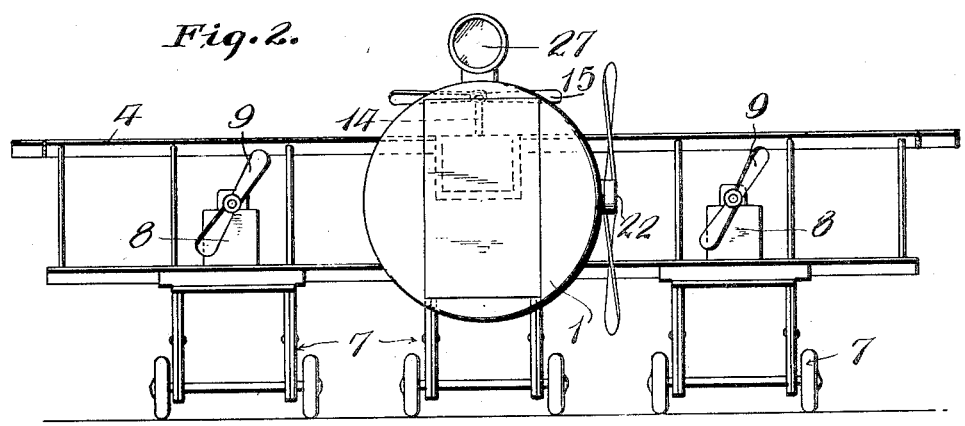
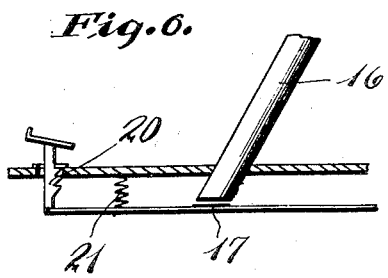
Inventor
Willie Catagains
By William C. Linton
Attorney Nov. 27, 1923.
W. CALAGAINS
AIRPLANE
Filed Aug. 22, 1923
1,475,790
2 Sheets-Sheet 2
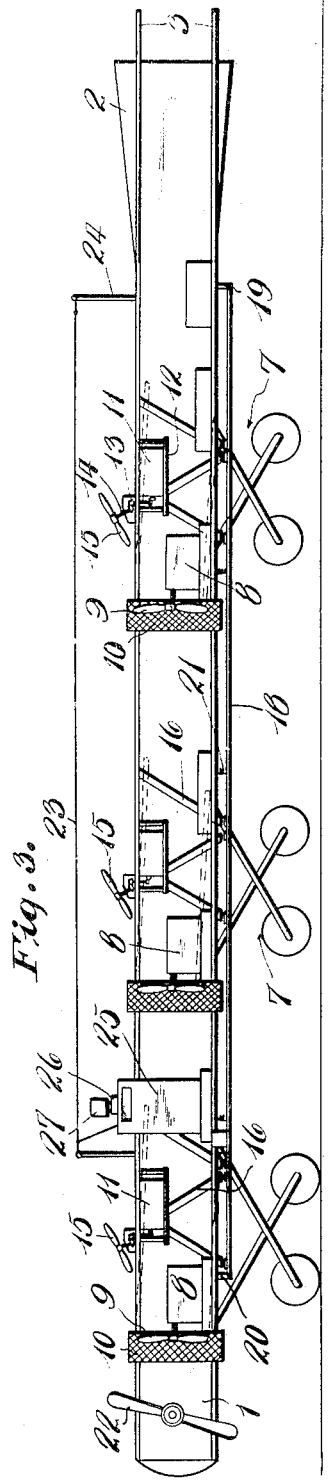
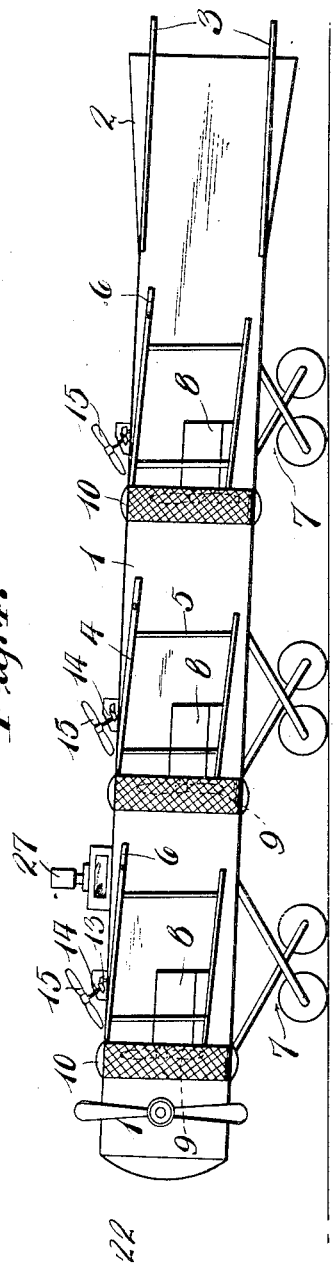
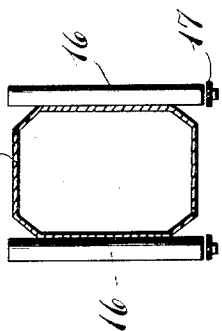
Inventor
*Willie Calagains*
By *William C. Linton*
Attorney Patented Nov. 27, 1923.

1,475,790

UNITED STATES PATENT OFFICE.

WILLIE CALAGAINS, OF GARY, INDIANA, ASSIGNOR TO LILLIAN CALAGAINS, LUCILE CALAGAINS, PEARL CALAGAINS, HATTIE CALAGAINS, BERTHA CALAGAINS, AND WILLIEMAE CALAGAINS, ALL OF GARY, INDIANA.

AIRPLANE.

Application filed August 22, 1923. Serial No. 658,782.

*To all whom it may concern:*

Be it known that I, WILLIE CALAGAINS, a citizen of the United States of America, residing at Gary, in the county of Lake and State of Indiana, have invented certain new and useful Improvements in Airplanes; and I do hereby declare that the following is a full, clear, concise, and exact description of the invention, such as will enable others skilled in the art to which it appertains to make and use the same.

This invention relates to improvements in airplanes, having for an object to provide an airplane providing a novel arrangement of sustaining planes or wings, whereby to lend to the flight and lifting efficiency of the machine in order that the same may be successfully used for commercial purposes, the propeller means of the machine being so positioned as to afford the same with a maximum driving thrust and likewise, to augment the lifting and sustaining efficiency thereof.

It is furthermore an object of the invention to provide an airplane with means whereby a portion of the air pressure created by the propellers rotating at a high velocity will be diverted to the under side of the fuselage and wings in order that the lifting efficiency of the machine, as when "taking off" into a flight, will be enhanced.

Other objects will be in part obvious and in part pointed out hereinafter.

In order that the invention and its mode of operation may be readily understood by persons skilled in the art, I have in the accompanying illustrative drawings, and in the detailed following description based thereon, set out one possible embodiment of the same.

In these drawings:—

Figure 1 is a top plan view of the improved airplane;

Figure 2 is a front elevation thereof;

Figure 3 is a side elevation of the machine with the planes or wings removed, showing the positioning of the propellers in the fuselage of the machine and the air pressure diverting means;

Figure 4 is a side elevation of the machine, slightly reduced;

Figure 5 is a vertical transverse section, in fragment, through the fuselage of the machine showing the positioning of the air pressure diverting means with respect to the same; and, Figure 6 is an enlarged fragmentary detail, partly in section, showing the valve control means for the air pressure diverting tubes or means.

Having more particular reference to the drawings, in connection with which like characters of reference will designate corresponding parts throughout, the improved air plane may be stated to comprise a fuselage generally indicated herein by the numeral 1, the same having various compartments for receiving passengers arranged therein, but not shown, as well as compartments for the pilot of the machine. A rudder 2 is provided upon the rearward extremity of the fuselage 1 as is usual as are tail planes or elevators 3, which, as will be understood, are connected with suitable control mechanism convenient to and operable by the machine pilot.

A plurality of pairs of vertically spaced relatively parallel wings or planes generally indicated by the numeral 4 are provided the machine, extending, as is usual, from the opposite sides of the fuselage and being suitably connected and braced with respect thereto; wing struts 5 being positioned as between the planes of the various pairs for an obvious purpose. In this connection, it is to be noted upon reference to the Figure 1, that the upper wings of the various succeeding pairs are provided with spaced balancing planes or wings generally indicated herein by the numeral 6, such balancing wings being, of course, operable by suitable mechanism from the pilot's compartment of the machine.

Suitable forms of under carriages, generally indicated by the numeral 7 are provided the machine and are arranged in succeeding relationship, as shown in the Figures 3 and 4, the rearwardly disposed under carriages being graduated in height whereby to cause the proper angular positioning of the machine when upon a surface in order that an effectual "take off" may be effected when the machine is entered into a flight.

Mounted upon the forward portions of the lower wings 4 of the succeeding pairs and directly adjacent the opposite sides of the fuselage 1 of the machine, are suitable forms of motors indicated by the numeral 8, having propellers 9 suitably mounted upon the driven shafts thereof; suitable guards 10 being provided for each of the propellers whereby to prevent injury to persons boarding or in proximity to the machine during their rotation. These guards 10 may be in form of a heavy mesh or reticulated material as is indicated in the accompanying drawings and also, may be secured to the fuselage by suitable form of struts or supporting arms extending from said fuselage.

Other motors generally indicated by the numeral 11 are fixedly mounted upon suitable supporting beds 12 arranged within and secured to the adjacent portion of the upper wall of the fuselage 1 as indicated in the Figures 1 and 3; the driven shafts of these motors being connected by suitable gearing indicated at 13 to a diagonally disposed upwardly extending propeller shaft 14, each of which carry a propeller 15 upon its upper end and arranged above and clear of the adjacent portion of the upper side or wall of the fuselage 1. Because of the forwardly and upwardly extending arrangement of the propeller shafts 14 and their respective propellers 15, it will be understood that these propellers when rotated at the proper velocity will serve as means for imparting not only a forward driving impulse to the plane when in flight, but likewise, will lend materially to the lifting and sustaining efficiency of the machine, thus stabilizing the same and rendering it advantageous and practical for use in commercial projects.

In the present embodiment of the invention, it will be noted that motors and propellers are provided for each of the succeeding sets of wings 4 and in this connection, it is of course to be understood that the number of motors and propellers may be varied such as conditions or preference may dictate as well as may the number of succeeding planes be varied.

With a view towards providing means for further aiding or enhancing the lifting efficiency of the machine, as when the same is being driven forward over a surface preparatory to "taking off" in a flight, I arrange upon the opposite sides of the fuselage 1, oppositely extending diagonally arranged tubes generally indicated by the numeral 16, said tubes being secured to adjacent portions of the fuselage by suitable fastening devices and having the upper ends thereof disposed in proximity to the plane in which the upper wall or top of the fuselage 1 is arranged, as is clearly indicated in the Figure 5. The lower ends of these tubes 16 are extended for a distance slightly below the bottom of the fuselage 1 as is also shown in the Figure 5 and are adapted to have their open lower ends provided with forms of plate valves 17, which, as will be noted upon reference to the Figure 3. are carried upon longitudinally disposed operating bars 18 arranged adjacent the opposite sides and lower portions of the fuselage 1 and extending longitudinally thereof and in parallel relation to the same. One end of each of these bars 18 is pivotally connected to a suitable bracket 19 secured to the adjacent rearward portions of the fuselage 1, while the forward ends of said operating bars are connected to suitable operating mechanism, fragmentally shown herein and indicated by the numeral 20, such operating mechanism extending to a point within the pilot compartment of the machine and being adapted to be operated by the pilot whereby with movement of the operating bars, the plate valves 18 carried thereon may be brought into or out of engagement with the open lower ends of their respective tubes 16. In this connection, it is to be noted that contractile coiled springs generally indicated by the numeral 21 are connected as between portions of the several operating bars 18 and adjacent portions of the fuselage 1 and in consequence, will serve to retain such operating bars in positions whereat the valves 17 thereon will normally close the open lower ends of the tubes 16.

Another motor, not shown, may be and preferably is arranged in the forward bow portion of the fuselage 1 and has a forwardly extending rotatable propeller 22 mounted thereon whereby to lend further to the driving or flight efficiency of the airplane.

The airplane, if desired, may be equipped with various devices or apparatus to expedite its travel and for convenience of the passengers. For example, the machine may be equipped with suitable radio receiving and transmitting apparatus, the apparatus proper being arranged in certain of the compartments of the fuselage, while an aerial or antenna 23 is supported upon suitable masts 24 fixedly arranged upon the upper side or top of the fuselage adjacent its forward and rearward extremities, as is shown in the Figure 3, coupling with the aerial being effected by a conductor 24 extending from the same downwardly into the compartment containing the radio receiving and transmitting apparatus as shown in the Figure 3 and indicated by the numeral 25. This compartment, of course, may be provided with windows 26 and suitable ways of ingress and egress. Furthermore, if desired, a search light 27 may be arranged upon the roof of the compartment 25 or other point of vantage upon the fuselage 1, such as conditions or preference may dictate.

In operation, each of the various motors 8 and 11 are started and operated collectively, thus causing a forward driving thrust and in consequence, effecting the forward movement of the machine over a surface until sufficient speed for the "take off" into flight is attained. The distance covered by the machine in its "take off" preparatory to entering into flight will be materially reduced by reason of the lifting tendency of the rotating propellers 15 mounted upon the propeller shaft 14 of the motors 11 and likewise, when the machine is in flight, these propellers 15 will serve to materially increase the lifting and sustaining efficiency of the same, whereas the propellers 9 will impart a direct driving thrust to the machine for carrying it through space. As the airplane is moving over a surface in its "take off" preparatory to flight, the operating bars 18 are moved downwardly by the operating means 20 actuated by the pilot within his compartment and with opening of the lower ends of the tubes 16, it will be understood that a material portion of the air pressure created by the rapidly rotating propellers 15 will be diverted to the lower portion of the fuselage and the lower planes or wings 4, thus affording further means for expediting the "take off" of the machine into flight and likewise, materially increasing its lifting efficiency. When the machine is in flight, the operating mechanism 20 may be released, whereupon the coiled springs 21 will immediately return the operating bars 18 to their normal positions whereat the various valves 17 will return to their closed positions over the lower ends of the air pressure diverting tubes 16.

If desired, when the machine is in flight, the motors 11 driving the propellers 15 may be stopped; the propellers 9 being fully capable of imparting the desired forward driving thrust to the machine. However, when it is desired to increase the altitude of the air plane, the motors 11 will again be started whereupon the rapidly rotating propellers 15 will again impart a combined lifting and driving thrust to the machine. Furthermore, these propellers 15 may be utilized to advantage when the machine is returning to terraine from flight, the same being rotated at a comparatively slow rate of speed, but yet at a velocity sufficient to serve as a means for effectually retarding the drop or descent of the air plane. In consequence, perfect landing of the machine may be effected and furthermore, the objectionable and so-termed "pancaking" of the machine, caused by its engagement with terraine and bounding of the same thereover will be eliminated.

Manifestly, the construction shown is capable of considerable modification and such modification as is within the scope of my claim, I consider within the spirit of my invention.

I claim:

In an airplane, pairs of superposed wings secured to and extending laterally from the opposite sides of the fuselage thereof, said pairs of wings being arranged in succeeding relationship, propeller means mounted upon the lower planes of each of said pairs adjacent their forward portions, other propeller means carried upon the top of said fuselage and extending forwardly thereof and arranged at angles to the same, whereby to impart a combined lifting and driving thrust to the airplane, air diverting tubes extending diagonally downward over the opposite sides of the fuselage and secured thereto having their opposite ends opened, said opened opposite ends of the tubes being extended slightly beyond the upper and lower portions of said fuselage, the upper ends of said tubes being arranged in proximity to the last mentioned propeller means, and valve mechanism collectively operable from within the fuselage for normally closing the open lower ends of said tubes.

In witness whereof I have hereunto set my hand.

WILLIE CALAGAINS.